United States Patent
Chen et al.

(10) Patent No.: US 7,209,535 B2
(45) Date of Patent: Apr. 24, 2007

(54) FOURIER SPACE TOMOGRAPHIC IMAGE RECONSTRUCTION METHOD

(75) Inventors: Guang-Hong Chen, Madison, WI (US); Charles A. Mistretta, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 363 days.

(21) Appl. No.: 10/861,579

(22) Filed: Jun. 4, 2004

(65) Prior Publication Data

US 2004/0258194 A1 Dec. 23, 2004

Related U.S. Application Data (60) Provisional application No. 60/480,136, filed on Jun. 20, 2003.

(51) Int. Cl.
    *A61B 6/03* (2006.01)
(52) U.S. Cl. ............................. 378/4; 378/901
(58) Field of Classification Search ........... 250/363.02–363.04; 378/4, 15, 901, 19, 210; 382/280
    See application file for complete search history.

(56) References Cited

U.S. PATENT DOCUMENTS

| | | | | |
|---|---|---|---|---|
| 4,616,318 A | * | 10/1986 | Crawford | 378/54 |
| 4,991,093 A | * | 2/1991 | Roberge et al. | 382/131 |
| 5,257,183 A | | 10/1993 | Tam | |
| 5,270,926 A | | 12/1993 | Tam | |
| 5,400,255 A | | 3/1995 | Hu | |
| 5,625,660 A | | 4/1997 | Tuy | |
| 5,654,995 A | * | 8/1997 | Flohr | 378/10 |
| 5,796,803 A | * | 8/1998 | Flohr et al. | 378/15 |
| 6,097,784 A | | 8/2000 | Tuy | |
| 6,104,775 A | | 8/2000 | Tuy | |
| 6,115,446 A | | 9/2000 | Pan | |
| 6,219,441 B1 | | 4/2001 | Hu | |
| 6,687,422 B1 | * | 2/2004 | Chen et al. | 382/300 |

FOREIGN PATENT DOCUMENTS

EP    0543573 A2 * 11/1992

OTHER PUBLICATIONS

L.A. Feldkamp et al "Practical Cone Beam Algorithm" J. Opt. Soc. Am. A1, 612-619 (1984).
G. Wang et al "A General Cone-Beam Reconstruction Algorithm" IEEE Trans. Med. Imaging 12, 486-496 (1993).
A. Katsevich "Theoretically Exact Filtered Backprojection-Type Inversion Algorithm For Spiral CT" SIAM (Soc. Ind. Appl. Math) J. Appl. Math. 62, 2012-2026 (2002).
Guang-Hong Chen, A New Framework Of Image Reconstruction From Fan Beam Projections, Am. Assoc. Phys. Med., Med. Phys. 30(6), Jun. 2003, pp. 1151-1161.
Shuang-Ren Zhao, A New Fourier Method For Fan Beam Reconstruction, Electronic Laboratory, Research Centre, Julich Germany, Oct. 17, 1995, pp. 1287-1291.
Guang-Hong Chen, A Generalized Projection-Slice Theorem For The Divergent Beam Projections, Proc. of SPIE vol. 5535, pp. 301-309.

* cited by examiner

*Primary Examiner*—Edward J. Glick
*Assistant Examiner*—John M. Corbett
(74) *Attorney, Agent, or Firm*—Quarles & Brady LLP (57) ABSTRACT

A generalized projection-slice theorem for divergent beam projections is disclosed. The theorem results in a method for processing the Fourier transform of the divergent beam projections at each view acquired by a CT system to the Fourier transform of the object function. Using this method, an inverse Fourier transform may be used to reconstruct tomographic images from the acquired divergent beam projections.

17 Claims, 9 Drawing Sheets

IMAGE SPACE    FOURIER SPACE

IMAGE SPACE      FOURIER SPACE

FIG. 14A

FOURIER SPACE

FIG. 14B

FOURIER SPACE

FOURIER SPACE TOMOGRAPHIC IMAGE RECONSTRUCTION METHOD

CROSS-REFERENCE TO RELATED APPLICATIONS

This application claims the benefit of U.S. Provisional patent application Ser. No. 60/480,136 filed on Jun. 20, 2003 and entitled "A Fourier Space Tomographic Image Reconstruction Method".

STATEMENT REGARDING FEDERALLY SPONSORED RESEARCH

This invention was made with government support under Grant No. EB 001683 awarded by the National Institute of Health. The United States Government has certain rights in this invention.

BACKGROUND OF THE INVENTION

The present invention relates to computed tomography (CT) imaging apparatus; and more particularly, to a method for reconstructing images from divergent beams of acquired image data.

In a current computed tomography system, an x-ray source projects a fan-shaped beam which is collimated to lie within an X-Y plane of a Cartesian coordinate system, termed the "imaging plane." The x-ray beam passes through the object being imaged, such as a medical patient, and impinges upon an array of radiation detectors. The intensity of the transmitted radiation is dependent upon the attenuation of the x-ray beam by the object and each detector produces a separate electrical signal that is a measurement of the beam attenuation. The attenuation measurements from all the detectors are acquired separately to produce the transmission profile.

The source and detector array in a conventional CT system are rotated on a gantry within the imaging plane and around the object so that the angle at which the x-ray beam intersects the object constantly changes. A group of x-ray attenuation measurements from the detector array at a given angle is referred to as a "view" and a "scan" of the object comprises a set of views made at different angular orientations during one revolution of the x-ray source and detector. In a 2D scan, data is processed to construct an image that corresponds to a two dimensional slice taken through the object. The prevailing method for reconstructing an image from 2D data is referred to in the art as the filtered backprojection technique. This process converts the attenuation measurements from a scan into integers called "CT numbers" or "Hounsfield units", which are used to control the brightness of a corresponding pixel on a display.

The term "generation" is used in CT to describe successively commercially available types of CT systems utilizing different modes of scanning motion and x-ray detection. More specifically, each generation is characterized by a particular geometry of scanning motion, scanning time, shape of the x-ray beam, and detector system.

Figure 1:
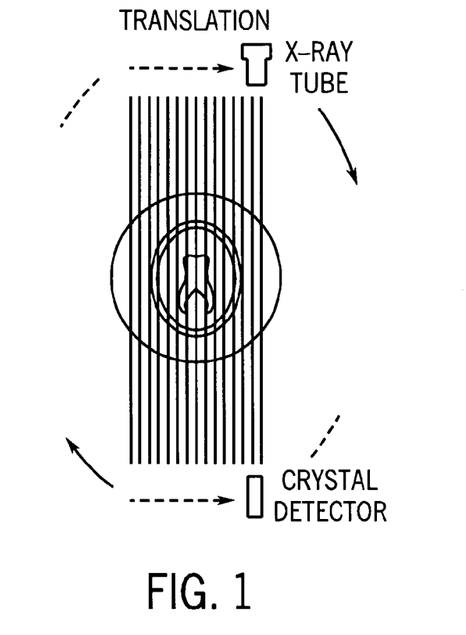
FIGS. 1–4 are schematic representations of different CT system geometries.

As shown in FIG. 1, the first generation utilized a single pencil x-ray beam and a single scintillation crystal-photomultiplier tube detector for each tomographic slice. After a single linear motion or traversal of the x-ray tube and detector, during which time 160 separate x-ray attenuation or detector readings are typically taken, the x-ray tube and detector are rotated through 1° and another linear scan is performed to acquire another view. This is repeated typically to acquire 180 views.

Figure 2:
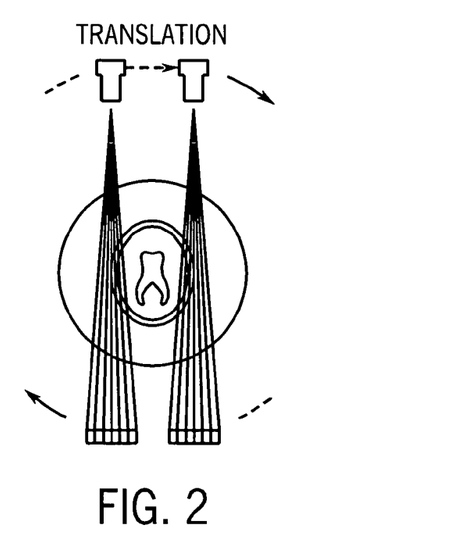

A second generation of devices developed to shorten the scanning times by gathering data more quickly is shown in FIG. 2. In these units a modified fan beam in which anywhere from three to 52 individual collimated x-ray beams and an equal number of detectors are used. Individual beams resemble the single beam of a first generation scanner. However, a collection of from three to 52 of these beams contiguous to one another allows multiple adjacent cores of tissue to be examined simultaneously. The configuration of these contiguous cores of tissue resembles a fan, with the thickness of the fan material determined by the collimation of the beam and in turn determining the slice thickness. Because of the angular difference of each beam relative to the others, several different angular views through the body slice are being examined simultaneously. Superimposed on this is a linear translation or scan of the x-ray tube and detectors through the body slice. Thus, at the end of a single translational scan, during which time 160 readings may be made by each detector, the total number of readings obtained is equal to the number of detectors times 160. The increment of angular rotation between views can be significantly larger than with a first generation unit, up to as much as 36°. Thus, the number of distinct rotations of the scanning apparatus can be significantly reduced, with a coincidental reduction in scanning time. By gathering more data per translation, fewer translations are needed.

Figure 3:
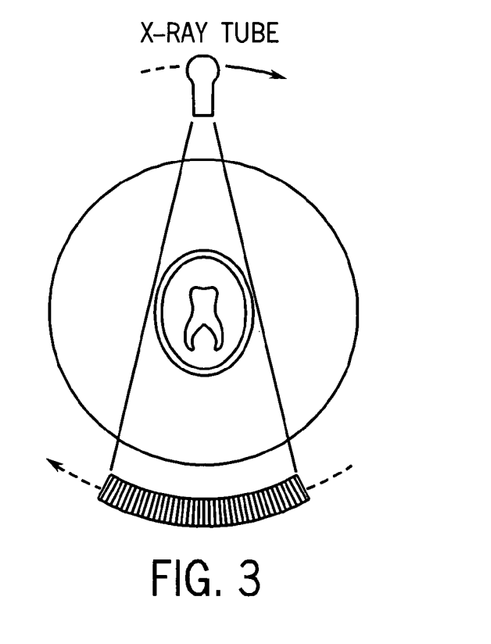

To obtain even faster scanning times it is necessary to eliminate the complex translational-rotational motion of the first two generations. As shown in FIG. 3, third generation scanners therefore use a much wider fan beam. In fact, the angle of the beam may be wide enough to encompass most or all of an entire patient section without the need for a linear translation of the x-ray tube and detectors. As in the first two generations, the detectors, now in the form of a large array, are rigidly aligned relative to the x-ray beam, and there are no translational motions at all. The tube and detector array are synchronously rotated about the patient through an angle of 180–360°. Thus, there is only one type of motion, allowing a much faster scanning time to be achieved. After one rotation, a single tomographic section is obtained.

Figure 4:
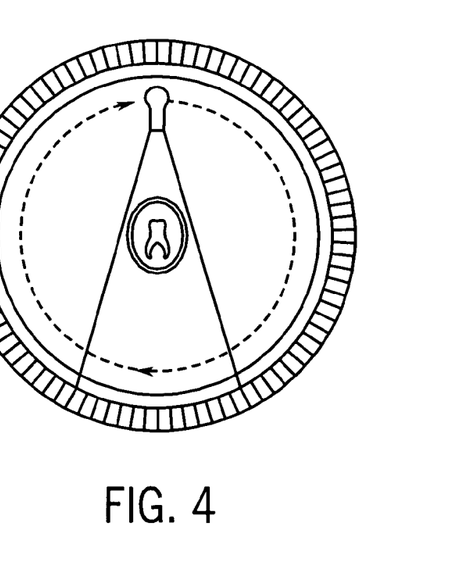

Fourth generation scanners feature a wide fan beam similar to the third generation CT system as shown in FIG. 4. As before, the x-ray tube rotates through 360° without having to make any translational motion. However, unlike in the other scanners, the detectors are not aligned rigidly relative to the x-ray beam. In this system only the x-ray tube rotates. A large ring of detectors are fixed in an outer circle in the scanning plane. The necessity of rotating only the tube, but not the detectors, allows faster scan time.

Most of the commercially available CT systems employ image reconstruction methods based on the concepts of Radon space and the Radon transform. For the pencil beam case, the data is automatically acquired in Radon space. Therefore a Fourier transform can directly solve the image reconstruction problem by employing the well-known Fourier-slice theorem. Such an image reconstruction procedure is called filtered backprojection (FBP). The success of FBP reconstruction is due to the translational and rotational symmetry of the acquired projection data. In other words, in a parallel beam data acquisition, the projection data are invariant under a translation and/or a rotation about the object to be imaged. For the fan beam case, one can solve the image reconstruction problem in a similar fashion, however, to do this an additional "rebinning" step is required to transform the fan beam data into parallel beam data. The overwhelming acceptance of the concepts of Radon space and the Radon transform in the two dimensional case gives this approach to CT image reconstruction a paramount position in tomographic image reconstruction.

Figure 5:
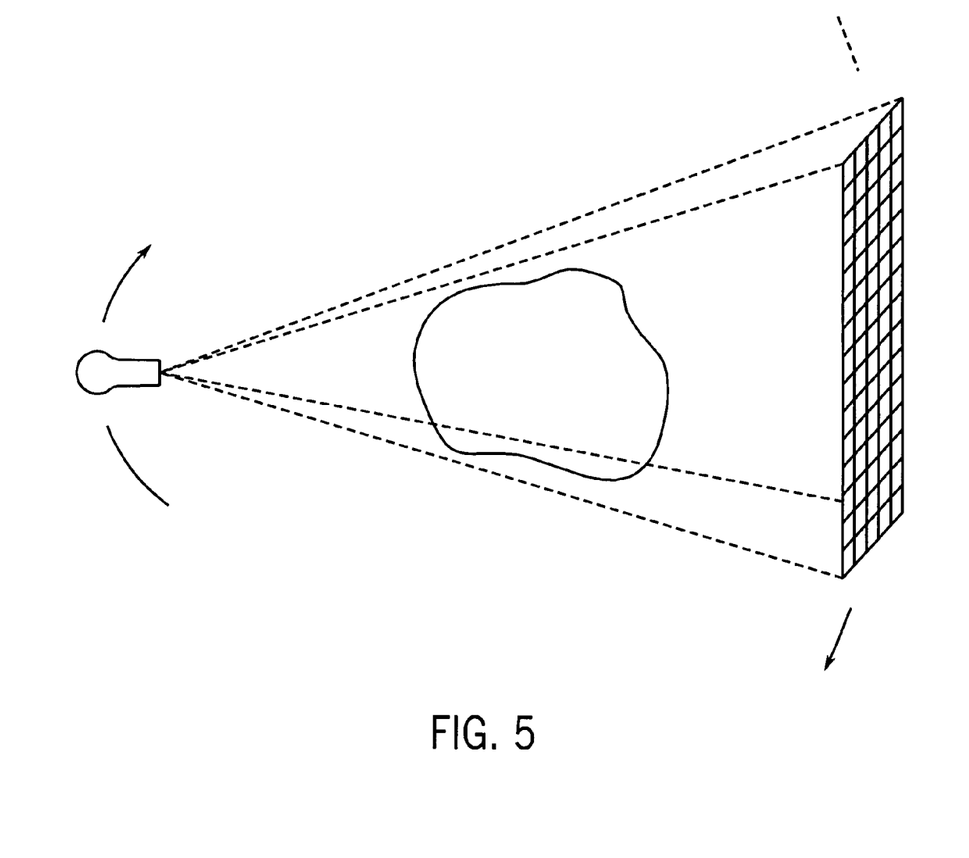
FIG. 5 is a pictorial representation of a 3D, or volume, CT system.

The Radon space and Radon transformation reconstruction methodology is more problematic when applied to three-dimensional image reconstruction. Three-dimensional CT, or volume CT, employs an x-ray source that projects a cone beam on a two-dimensional array of detector elements as shown in FIG. 5. Each view is thus a 2D array of x-ray attenuation measurements and a complete scan produced by acquiring multiple views as the x-ray source and detector array are revolved around the subject results in a 3D array of attenuation measurements. The reason for this difficulty is that the simple relation between the Radon transform and the x-ray projection transform for the 2D case in not valid in the 3D cone beam case. In the three-dimensional case, the Radon transform is defined as an integral over a plane, not an integral along a straight line. Consequently, we have difficulty generalizing the success of the Radon transform as applied to the 2D fan beam reconstruction to the 3D cone beam reconstruction. In other words, we have not managed to derive a shift-invariant FBP method by directly rebinning the measured cone beam data into Radon space. Numerous solutions to this problem have been proposed as exemplified in U.S. Pat. Nos. 5,270,926; 6,104,775; 5,257,183; 5,625,660; 6,097,784; 6,219,441; and 5,400,255.

It is well known that the projection-slice theorem (PST) plays an important role in the image reconstruction from two- and three-dimensional parallel-beam projections. The power of the PST lies in the fact that Fourier transform of a single view of parallel-beam projections is mapped into a single line (two-dimensional case) or a single slice (three-dimensional case) in the Fourier space via the PST. In other words, a complete Fourier space of the image object can be built up from the Fourier transforms of the sequentially measured parallel-beam projection data. Once all the Fourier information of the image object is known, an inverse Fourier transform can be performed to reconstruct the image. Along the direction of the parallel-beam projections, there is a shift-invariance of the image object in a single view of the parallel-beam projections. This is the fundamental reason for the one-to-one correspondence between the Fourier transform of parallel-beam projections and a straight line or a slice in the Fourier space. The name of the projection-slice theorem follows from this one-to-one correspondence.

In practice, divergent fan-beam and cone-beam scanning modes have the potential to allow fast data acquisition. But image reconstruction from divergent-beam projections poses a challenge. In particular, the PST is not directly applicable to the divergent-beam projections since the shift-invariance in a single view of projections is lost in the divergent-beam cases. One way to bypass this problem is to explicitly rebin the measured divergent-beam projections into parallel beam projections. This is the basic method currently used in solving the problem of fan-beam image reconstruction. After the rebinning process, one can take the advantages of the fast Fourier transforms (FFT) to efficiently reconstruct images. There are some issues on the potential loss of image spatial resolution due to the data rebinning. But there are also some advantages in generating uniform distribution of image noise due to the non-local characteristic of the Fourier transform. Alternatively, a fan-beam projection can also be relabeled in terms of Radon variables so that the two-dimensional inverse Radon transform can be used to reconstruct images. In this way, a convolution-based fan-beam image reconstruction algorithm can be readily developed. The advantage of this type of reconstruction algorithm is the explicit filtered backprojection (FBP) structure. The disadvantage of the convolution-based method is that the weight in the backprojection step depends on the individual image pixels and thus noise distribution may not be uniform. This may pose problems in the clinical interpretation of tomographic images. In practice, different CT manufactures may utilize different strategies in balancing these advantages and disadvantages.

In the cone-beam case, it is much more complicated to rebin cone-beam projections into parallel-beam projections. The huge cone-beam data set also poses a big challenge to the potential data storage during the rebinning process. The main stream of the developments in cone-beam reconstruction has been focused on the development of approximate or exact reconstruction methods. For circular-based source trajectories, methods disclosed by L. A. Feldkamp, L. C. Davis, and J. W. Kress, "Practical Cone Beam Algorithm," J. Opt. Soc. Am. A 1, 612–619(1984); G. Wang, T. H. Lin, P. Cheng, and D. M. Shinozaki, "A general cone-beam reconstruction algorithm," IEEE Trans. Med. Imaging 12, 486–496 (1993); generate acceptable image quality up to moderate cone angles (up to 10° or so). Exact reconstruction algorithms have also been proposed and further developed for both helical source trajectory and more general source trajectories. Most recently, a mathematically exact and shift-invariant FBP reconstruction formula was proposed for the helical/spiral source trajectory A. Katsevich, "Theoretically exact filtered backprojection-type inversion algorithm for spiral CT," SIAM (Soc. Ind. Appl. Math.) J. Appl. Math. 62, 2012–2026 (2002). Starting with either the original Tuy's framework or Grangeat's framework, upon an appropriate choice of weighting function over the redundant data, shift-invariant FBP reconstruction formula has been derived for a general source trajectory. Similar to the fan-beam FBP reconstruction algorithm the characteristic of the convolution-based cone-beam reconstruction algorithm is the voxel-dependent weighting factor in the backprojection step. This will cause non-uniform distribution of the image noise. Moreover, due to the local nature of the newly developed convolution-based cone-beam image reconstruction algorithms, different image voxels are reconstructed by using cone-beam projection data acquired at different pieces of the source trajectory. Namely, different image voxels are reconstructed by using the data acquired under different physical conditions. This will potentially lead to some data inconsistency in dynamic imaging. Finally, the current convolution-based image reconstruction algorithms are only valid for some discrete pitch values in the case of helical/spiral source trajectory. This feature limits their application in a helical/spiral cone-beam CT scanner.

Therefore, it is desirable to have some alternative ways to allow a balance between computational efficiency and non-local noise distribution in the cone-beam image reconstruction. It is also important to avoid a global data rebinning procedure. Namely, a data rebinning procedure from cone-beam projection data to parallel-beam projections after the data acquisition is complete.

SUMMARY OF THE INVENTION

The present invention is a new method for reconstructing an image of an object from acquired divergent beam data in which the acquired data is backprojected to points along each divergent beam and weighted by a factor of one over the distance r (1/r) between the data point and the source point of the beam, Fourier transforming the backprojected data and processing it to form an acquired k-space data set, phase shifting and weighting the acquired k-space data to correlate it with a reference k-space, and reconstructing an image by performing an inverse Fourier transformation of the k-space data. An image can be reconstructed as each view of divergent beam data is acquired by summing together successive, referenced k-space data sets or by summing together successive reconstructed images.

A general object of the invention is to extend the parallel-beam projection-slice theorem to the divergent fan-beam and cone-beam projections without rebinning the divergent fan-beam and cone-beam projections into parallel-beam projections directly. A novel link between the local Fourier transform of the projection data and the Fourier transform of the image object is established. Analogous to the two- and three-dimensional parallel-beam cases, the measured projection data are backprojected along the projection direction and then a local Fourier transform is taken for the backprojected data array. However, due to the loss of the shift-invariance of the image object in a single view of the divergent-beam projections, the measured projection data is weighted by a distance dependent weight w(r) before the local Fourier transform is performed. The variable r in the weighting function w(r) is the distance from the backprojected point to the X-ray source position. It is shown that a special choice of the weighting function, w(r)=1/r, will facilitate the calculations and a simple relation can be established between the Fourier transform of the image function and the local Fourier transform of the 1/r—weighted backprojection data array. Unlike the parallel-beam cases, a one-to-one correspondence does not exist for a local Fourier transform of the backprojected data array and a single line in two-dimensional case or a single slice in three-dimensional case of the Fourier transform of the image function. However, the Fourier space of the image object can be built up after the local Fourier transforms of the 1/r—weighted backprojection data arrays are shifted and added up in a laboratory frame. Thus relations between the Fourier space of the image object and the Fourier transforms of the backprojected data arrays can be viewed as a generalized projection-slice theorem for divergent fan-beam and cone-beam projections. Once the Fourier space of the image function is built up, an inverse Fourier transform can be performed to reconstruct tomographic images from the divergent beam projections. Due to the linearity of the Fourier transform, the image reconstruction step can be performed either when the complete Fourier space is available or in the course of building the Fourier space.

An object of this invention is to provide a method of sequentially constructing the Fourier space of an image object during the divergent-beam projection data acquisition process. A connection between the Fourier transform of the pre-weighted backprojection data array and the Fourier transform of the image object is provided. Analogous to the parallel-beam PST, the established relation is called a generalized projection-slice theorem (GPST) for divergent fan-beam and cone-beam projections. The advantages of this GPST are the following. First, the theoretical structure is in a unified fashion for both fan-beam and cone-beam cases due to the linearity of the Fourier transforms. Second, due to the non-local property of the Fourier transforms, a uniform distribution of noise background is possible. Third, a software-FFT or a dedicated hardware-FFT electronic board can be used to efficiently reconstruct images.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

GENERAL DESCRIPTION OF THE INVENTION

Figure 8:
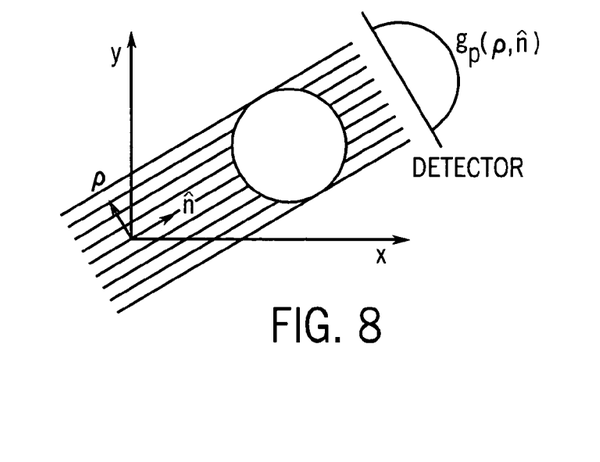
FIGS. 8 and 9 are schematic representations of a generalized parallel beam source and detector array.

To better understand the present invention a brief review of the conventional, parallel-beam projection slice theorem is helpful. For simplicity, suppose there exists an X-ray source that generates perfect parallel beams and the beams are sufficiently wide to cover the whole image object as shown in FIG. 1. A detector is used to detect the attenuated X-ray beams. For a specific orientation n of the X-ray beams, a profile of the attenuated X-ray parallel beams is recorded. We call such a profile a view of projections and denote it as $g_p(\rho,\hat{n})$. A subscript p is used to label the parallel beam projections. A Greek letter $\rho$ is used to label the distance of a specific X-ray from the iso-ray as shown in FIG. 8.

If a function $f(\vec{x})$ is used to label the spatial distribution of the X-ray attenuation coefficients, the projection $g_p(\rho,\hat{n})$ is written as:

$$g_p(\rho,\hat{n}) = \int d^2\vec{x}\, f(\vec{x})\delta(\rho - \vec{x}\cdot\hat{n}^\perp) \tag{1}$$

where $\hat{n}^\perp$ is a unit vector perpendicular to unit vector $\hat{n}$. In the two-dimensional case, Eq. (1) is a line integral along the line parallel to the unit vector $\hat{n}$ and the distance between the integral line and the iso-ray is $\rho$. The definition (1) can also be viewed as a two-dimensional Radon transform in terms of another group of variables $(\rho,\hat{n}^\perp)$.

Figure 9:
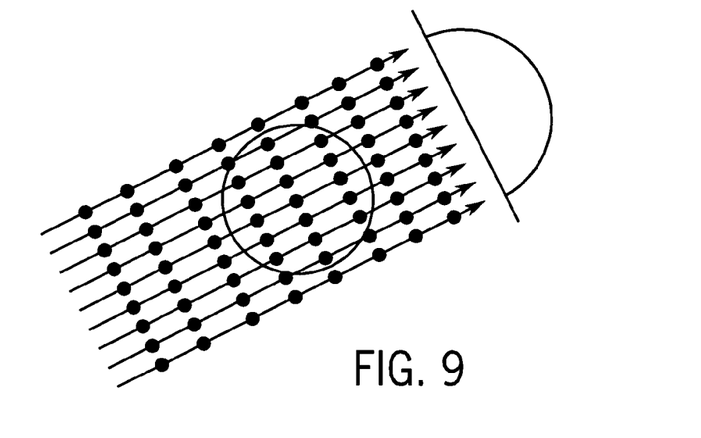

To connect the measured projections $g_p(\rho,\hat{n})$ to the Fourier components of the image function $f(\vec{x})$, a natural idea is to match the dimensions of measured projections and the Fourier transform of the image object. Note that the measured projections are one-dimensional for a two-dimensional image object. To compensate the dimensional mismatch between measured projections and the dimensions of an image object, an operation called back-projection is introduced. Namely, we put the measured projections back (back-project) along the X-ray beams as shown in FIG. 9.

An important observation about the backprojection operation in parallel beam projections is a shift-invariance of the image object along the X-ray projection directions. Therefore, all the backprojecting lines are equivalent and thus an equal weight should be assigned to the backprojecting line during the backprojection operations. In FIG. 9, it is illustrated that the measured projection data are backprojected into two-dimensional data arrays such that the dimensional mismatch between the image object and its corresponding measured data disappears after the backprojection operation.

If the backprojected projections are denoted as $G_p(\vec{x}, \hat{n})$, then the backprojection operation can be expressed as $$G_p(\vec{x}, \hat{n}) = g_p(\rho = \vec{x} \cdot \hat{n}^\perp, \hat{n}) \qquad (2)$$

Now a connection between the Fourier transform of the image function $f(\vec{x})$ and the Fourier transform of backprojected data array $G_p(\vec{x}, \hat{n})$ can be established.

To do so, a local Fourier transform of backprojected data array is defined as $$F_p(\vec{k}, \hat{n}) = \int_{\mathcal{R}^2} d^2 \vec{x} G_p(\vec{x}, \hat{n}) e^{-i2\pi \vec{k} \cdot \vec{x}} \qquad (3)$$

$$= \int_{\mathcal{R}^2} d^2 \vec{x} g_p(\vec{x} \cdot \hat{n}^\perp, \hat{n}) e^{-i2\pi \vec{k} \cdot \vec{x}}$$

In the second equality, the definition of backprojection Eq. (2) has been used. Remember that our objective is to connect the Fourier transform of an image object to the Fourier transform $[F_p(\vec{k}, \hat{n})]$ of backprojected data array $G_p(\vec{x}, \hat{n})$. Thus it is natural to insert the definition of projection $g_p(\rho, \hat{n})$ in Eq. (1) into Eq. (3) to obtain:

$$F_p(\vec{k}, \hat{n}) = \int_{\mathcal{R}^2} d^2 \vec{x} g_p(\vec{x} \cdot \hat{n}^\perp, \hat{n}) e^{-i2\pi \vec{k} \cdot \vec{x}} \qquad (4)$$

$$= \int_{\mathcal{R}^2} d^2 \vec{x} \int_{\mathcal{R}^2} d^2 \vec{r} f(\vec{r}) \delta(\vec{x} \cdot \hat{n}^\perp - \vec{r} \cdot \hat{n}^\perp) e^{-i2\pi \vec{k} \cdot \vec{x}}$$

$$= \int_{\mathcal{R}^2} d^2 \vec{r} f(\vec{r}) e^{-i2\pi \vec{k} \cdot \vec{r}} \{ \int_{\mathcal{R}^2} d^2 \vec{x} \delta[(\vec{x} - \vec{r}) \cdot \hat{n}^\perp] e^{-i2\pi \vec{k} \cdot (\vec{x} - \vec{r})} \}$$

For convenience, a new vector $\vec{y}$ is introduced as $$\vec{y} = \vec{x} - \vec{r} = y_n \hat{n} + y_\perp \hat{n}^\perp \qquad (5)$$

Figure 10:
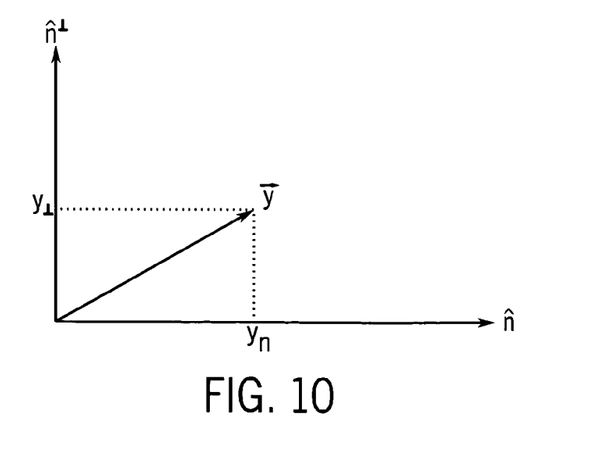
FIG. 10 is a graphic representation of a local coordinate system.

In the second equality, the vector $\vec{y}$ is projected along the unit vector $\hat{n}$ and the transverse direction $\hat{n}^\perp$. The orthonormal vectors $\hat{n}$ and $\hat{n}^\perp$ defines a local coordinate system as shown in FIG. 10. Using this decomposition, the integral in the curly bracket in Eq. (4) can be calculated as $$\int_{\mathcal{R}^2} d^2 \vec{x} \delta[(\vec{x} - \vec{r}) \cdot \hat{n}^\perp] e^{-i2\pi \vec{k} \cdot (\vec{x} - \vec{r})} = \int_{\mathcal{R}^2} d^2 \vec{y} \delta(\vec{y} \cdot \hat{n}^\perp) e^{-i2\pi \vec{k} \cdot \vec{y}} \qquad (6)$$

-continued $$= \int_{-\infty}^{+\infty} dy_\perp \delta(y_\perp) e^{-i2\pi y_\perp (\vec{k} \cdot \hat{n}^\perp)}$$

$$\int_{-\infty}^{+\infty} dy_n e^{-i2\pi y_n (\vec{k} \cdot \hat{n})}$$

$$= \delta(\vec{k} \cdot \hat{n})$$

Therefore, Eq. (4) is simplified as $$F_p(\vec{k}, \hat{n}) = \delta(\vec{k} \cdot \hat{n}) \int_{\mathcal{R}^2} d^2 \vec{r} f(\vec{r}) e^{-i2\pi \vec{k} \cdot \vec{r}} = \tilde{f}(\vec{k}) \delta(\vec{k} \cdot \hat{n}) \qquad (7)$$

Here $\tilde{f}(k)$ is the Fourier transform of the image function $f(\vec{x})$ and it is defined as $$\tilde{f}(\vec{k}) = \int_{\mathcal{R}^2} d^2 \vec{x} f(\vec{x}) e^{-i2\pi \vec{k} \cdot \vec{x}} \qquad (8)$$

Therefore, Eq. (7) gives the relation between the Fourier transform of the image object and the Fourier transform of the backprojected data array. The Dirac δ function tells that the longitudinal components of the Fourier transform of backprojected data array are zero. Namely, the Fourier transform of the backprojected data array cannot generate Fourier components along the projection direction. In other words, the Fourier transform of the backprojected data array generates a line in the two-dimensional Fourier space of the image object. This is the well-known parallel beam projection-slice-theorem. Intuitively, this result is transparent if one remembers the nature of the parallel beam backprojection operation: The measured data has been backprojected along the X-ray projection direction with an equal weight. Thus only the zero DC component of the Fourier transform is generated along the X-ray projection direction. All the nonzero components appear in a line or a slice perpendicular to the X-ray projection directions.

Figure 11:
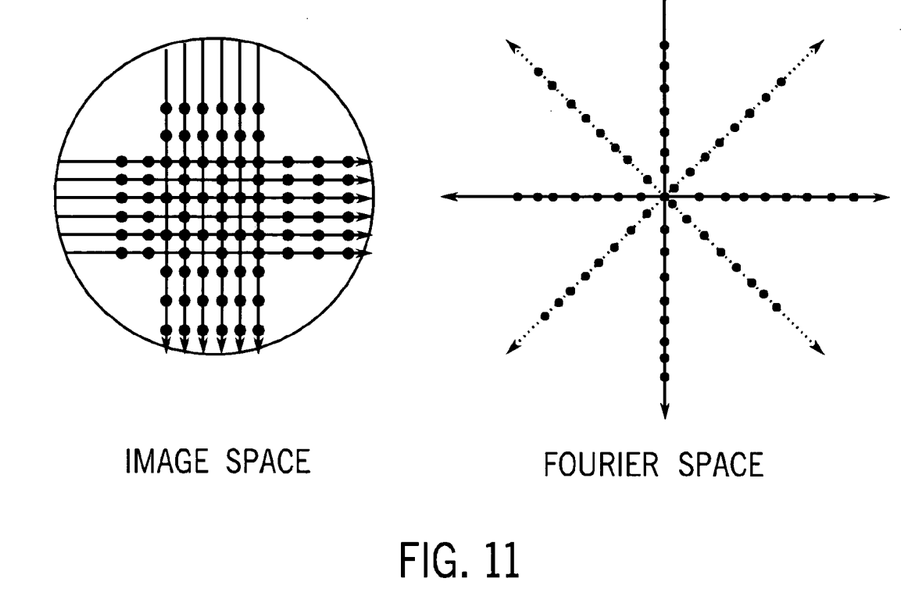
FIG. 11 is a pictorial representation of Fourier space data produced by parallel beam projections.

If the parallel beam is continuously rotated around a fixed direction in an angular range (0,180°), then a complete Fourier space can be built up by using the Fourier transform of the backprojected data arrays. This is schematically illustrated in FIG. 11.

In the three-dimensional case, the parallel-beam PST can be illustrated similarly by performing equal weighted backprojection and taking a local Fourier transform. It also should be noted that there are many other ways to derive the parallel-beam PST. We revisit this theorem to extract two key procedures (backprojection and local Fourier transform) in building the Fourier space of the image object.

Figure 12:
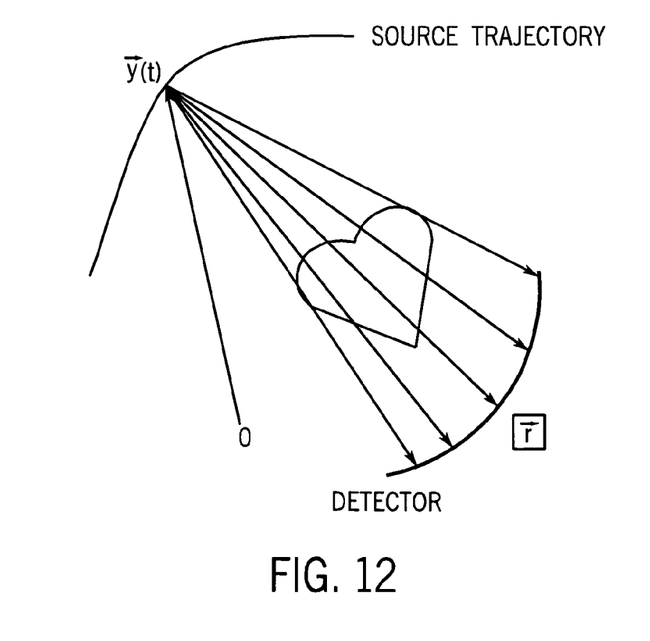
FIG. 12 is a pictorial representation of a divergent beam and its source trajectory.

The present invention extends the parallel-beam PST method to divergent-beam projections. A divergent beam (for both fan-beam and cone-beam) projection $g_d(\hat{r}, \vec{y})$ is defined as $$g_d[\hat{r}, \vec{y}(t)] = \int_0^\infty ds f[\vec{y}(t) + s\hat{r}]. \qquad (9)$$

Where the source trajectory vector $\vec{y}(t)$ is parameterized by a parameter t and $\hat{r}$ is a unit vector starting from the source position to the image object. This is illustrated in FIG. 12. The subscript d is used to label the divergent-beam projections while p has been used to label the parallel-beam projections in Eq. (1). The image function $f(\vec{x})$ is assumed to have a compact support $\Omega$, i.e., it is non-zero only in a finite spatial region. Throughout the paper, a vector will be decomposed as its magnitude and a unit vector, e.g. $\vec{r} = r\hat{r}$. Obviously, the measured data in Eq. (9) has a one-dimensional structure in the fan-beam case (the detector is one dimensional and the unit vector $\hat{r}$ is a single-parameter object) and has two-dimensional structure in the cone beam case (the detector is two-dimensional and thus the unit vector $\hat{r}$ becomes a two-parameter object). This is similar to that of the parallel-beam cases. The same strategy will also be employed to compensate the dimensional mismatch between the projection data and image object. Namely, a backprojection operation shall be used to extend the measured fan-beam data into a truly two-dimensional data array and also a three-dimensional data array can be generated from the measured cone-beam projection data.

When the measured divergent-beam projections are backprojected, a vital difference appears between the parallel-beam and divergent-beam projections. Namely, in a single view of divergent beam projections, the shift-invariance of the image object is lost. This fact dictates that the equal weight is not appropriate for backprojecting the measured divergent-beam projections as that in the parallel-beam cases. However, a striking feature of divergent-beam projections is their diverging nature. In other words, in each single view, all the projections converge to the same X-ray focal spot. Therefore, the backprojection operation is physically sensible only in a semi-infinite line: from the X-ray source position to infinity. Intuitively, an appropriate weight for the divergent-beam backprojection operation should be a function of the distance from X-ray source position to the backprojected point. If the distance from an X-ray source position $\vec{y}(t)$ to a backprojected point $\vec{x}$ is denoted as r, i.e., $r = |\vec{r} - \vec{y}(t)|$, then a weighting function w(r) can be assumed for backprojecting the divergent beam projections. Under this general assumption of weighting function, a weighted backprojection can be defined as $$G_d[\vec{x}, \vec{y}(t)] = w(r = |\vec{x} - \vec{y}(t)|) g_d[\hat{r} = \frac{\vec{x} - \vec{y}(t)}{|\vec{x} - \vec{y}(t)|}, \vec{y}(t)] \quad (10)$$

Figure 13:
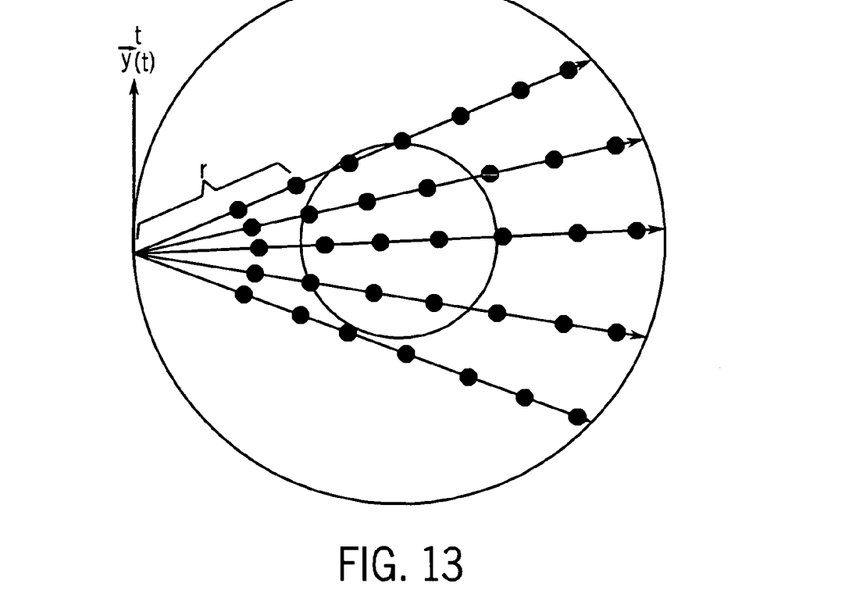
FIG. 13 is a pictorial representation of a back projected divergent beam projection.

The physical meaning of Eq. (10) is interpreted as follows and illustrated in FIG. 13. A measured projection value $g_d(\hat{r}, \vec{y})$ is multiplied by a weight $w(r = |\vec{x} - \vec{y}(t)|)$ and then backprojected along the direction $\hat{r}$ to a point $\vec{x}$ with distance $r = |\vec{x} - \vec{y}(t)|$.

After the backprojection operation in Eq. (10) is implemented, a one-dimensional fan-beam data array is upgraded into a two-dimensional data array. Similarly, a two-dimensional cone-beam data array is upgraded in a three-dimensional space.

Analogous to the parallel beam case, an objective of the present work is to establish a link between the Fourier transform of the above-defined backprojected divergent beam projections and the Fourier transform of the image function $f(\vec{x})$. In Eq. (10), the relevant variable in the backprojection operation is the distance r and the orientation $\hat{r}$. They form a vector $\vec{r}$ as follows:

$$\vec{r} = \vec{x} - \vec{y}(t) = r\hat{r}. \quad (11)$$

Thus it is convenient to take a Fourier transform of the backprojected data array in a local coordinate system centered at the X-ray focal spot. Namely, a Fourier transform of Eq. (10) with respect to the variable $\vec{r}$. To distinguish it from the parallel beam case, the Fourier transform of the backprojected data array is denoted as $\overline{F}_d[\vec{k}, \vec{y}(t)]$. Here a vector $\vec{y}(t)$ explicitly labels the local address where the local Fourier transform is being taken.

$$\overline{F}_d[\vec{k}, \vec{y}(t)] = \int_{\mathcal{R}^D} d^D\vec{r} G_d(\vec{x}, \vec{y}(t)) e^{-i2\pi \vec{k} \cdot \vec{r}} \quad (12)$$

$$= \int_{\mathcal{R}^D} d^D\vec{r} w(r) g_d[\hat{r}, \vec{y}(t)] e^{-i2\pi \vec{k} \cdot \vec{r}}$$

Substituting $g_d[\hat{r}, \vec{y}(t)]$ defined in Eq. (9) into Eq. (12), the following is obtained:

$$\overline{F}_d[\vec{k}, \vec{y}(t)] = \int_{\mathcal{R}^D} d^D \vec{r} w(r) g_d[\hat{r}, \vec{y}(t)] e^{-i2\pi \vec{k} \cdot \vec{r}} \quad (13)$$

$$= \int_{\mathcal{R}^D} d^D \vec{r} w(r) \int_0^{+\infty} ds f[\vec{y}(t) + s\hat{r}] e^{-i2\pi \vec{k} \cdot \vec{r}}$$

$$= \int_{\mathcal{R}^D} d^D \vec{r} w(r) r \left\{ \int_0^{+\infty} d\left(\frac{s}{r}\right) f\left[\vec{y}(t) + \frac{s}{r}\vec{r}\right] \right\} e^{-i2\pi \vec{k} \cdot \vec{r}}$$

$$= \int_{\mathcal{R}^D} d^D \vec{r} w(r) r \left\{ \int_0^{+\infty} ds' f[\vec{y}(t) + s'\vec{r}] \right\} e^{-i2\pi \vec{k} \cdot \vec{r}}$$

In the last line, a new dummy variable s'=s/r has been introduced. To establish the desired divergent-beam GPST, the following observation is important: both the vector $\vec{r}$ and its amplitude r appear in the integrand and this complicates the problem. However, up to this point, the choice of weighting function w(r) is arbitrary. Therefore, a proper weighting function could be used to simplify the calculations in Eq. (13). One choice is the following:

$$w(r)r = 1 \quad \text{i.e.} \quad w(r) = \frac{1}{r} \quad (14)$$

After the above choice on weight is made, the calculation of the Fourier transform of the backprojected divergent beam projections is significantly simplified as:

$$\overline{F}_d[\vec{k}, \vec{y}(t)] = \int_{\mathcal{R}^D} d^D \vec{r} \left\{ \int_0^{+\infty} ds f[\vec{y}(t) + s\vec{r}] \right\} e^{-i2\pi \vec{k} \cdot \vec{r}} \quad (15)$$

$$= F\left\{ \int_0^{+\infty} ds f[\vec{y}(t) + s\vec{r}] \right\}$$

Here a symbol F is introduced to label a Fourier transform. If the Fourier transform of the image function $f(\vec{x})$ is written as $\tilde{f}(\vec{k})$. Then the following scaling property and shifting property of Fourier transform can be used to further simplify Eq. (15).

Scaling property (in D-dimensional space):

$$F\{f(s\vec{r})\} = \frac{1}{s^D}\tilde{f}\left(\frac{\vec{k}}{s}\right) \quad (16)$$

Shifting property:

$$F\{f[\vec{y}(t)+s\vec{r}]\} = \frac{1}{s^D}\tilde{f}\left(\frac{\vec{k}}{s}\right)\exp\left[i2\pi\frac{\vec{k}}{s}\cdot\vec{y}(t)\right] \quad (17)$$

Substituting Eq. (17) into Eq. (15) yields:

$$\overline{F}_d[\vec{k},\vec{y}(t)] = \int_0^{+\infty}\frac{ds}{s^D}\tilde{f}\left(\frac{\vec{k}}{s}\right)e^{i2\pi\vec{k}\cdot\vec{y}(t)/s} \quad (18)$$

To obtain a transparent and physical understanding of Eq. (18), the following change of variable is helpful:

$$s' = \frac{k}{s} \quad \text{and} \quad ds = -k\frac{ds}{s'^2} \quad (19)$$

In terms of new integral variable s', Eq. (18) is cast into:

$$\overline{F}_d[\vec{k},\vec{y}(t)] = \frac{1}{k^{D-1}}\int_0^\infty ds's'^{D-2}\tilde{f}(s'\hat{k})\exp[i2\pi s'\hat{k}\cdot\vec{y}(t)]$$
$$= \frac{1}{k^{D-1}}\int_0^\infty ds\, s^{D-2}\tilde{f}(s\hat{k})\exp[i2\pi s\hat{k}\cdot\vec{y}(t)] \quad (20)$$

In the second line in Eq. (20), the integral variable has been written as s again since it is dummy after integration. A nice property in Eq. (20) is a decoupling of the radial part $$(\frac{1}{k^{D-1}})$$

from the angular part denoted as $\overline{C}_D[\hat{k},\vec{y}(t)]$:

$$\overline{F}_d[\vec{k},\vec{y}(t)] = \frac{1}{k^{D-1}}\overline{C}_D[\hat{k},\vec{y}(t)] \quad (21)$$

$$\overline{C}_D[\hat{k},\vec{y}(t)] = \int_0^\infty ds\, s^{D-2}\tilde{f}(s\hat{k})e^{i2\pi s\hat{k}\cdot\vec{y}(t)} \quad (22)$$

Eq. (20), or equivalently, Eq. (22) gives the relation between the Fourier transform of $$\frac{1}{r}-\text{weighted}$$

backprojection of a divergent data array and the Fourier transform $\tilde{f}(\vec{k})$ of the image function $f(\vec{x})$. However, due to the diverging nature of the beams, the information provided by a local Fourier transform of the backprojected data ($\overline{C}_D[\hat{k},\tilde{y}(t)]$) does not simply correspond to a single slice or a single line in the Fourier space of the image object as happened in the parallel-beam cases. However, this local Fourier transform is related to the desired Fourier transform of the image function in an elegant way. To see this point better, a composite variable p is introduced as following:

$$p=\hat{k}\cdot\vec{y}(t) \quad (23)$$

The meaning of the variable p is the projection distance of the X-ray source vector $\vec{y}(t)$ on a specific orientation $\hat{k}$ in the Fourier space. In terms of variable p, the functions $\overline{F}_D[\hat{k},\vec{y}(t)]$ and $\overline{C}_D[\hat{k},\vec{y}(t)]$ can be rebinned into $F_D(\hat{k},p)$ and $C_D(\hat{k},p)$ respectively via the following relations:

$$C_D(\hat{k},p)=\overline{C}_D[\hat{k},\vec{y}(t)] \quad (24)$$

$$F_D(\hat{k},p)=\overline{F}_D[\hat{k},\vec{y}(t)] \quad (25)$$

Therefore, Eq. (22) can be recast into the following form:

$$C_D(\hat{k},p) = \int_0^\infty ds\, s^{D-2}\tilde{f}(s\hat{k})e^{i2\pi sp} \quad (26)$$

In other words, $C_D(\hat{k},p)$ is linked to the Fourier transform $\tilde{f}(\vec{k})$ of the image object function by an inverse Fourier transform. A Fourier transform can be applied to obtain the Fourier transform $\tilde{f}(\vec{k})$ from the local Fourier transforms $C_D(\hat{k},p)$:

$$\tilde{f}(\vec{k}) = \frac{1}{k^{D-2}}\int_{-\infty}^{+\infty}dp\,C_D(\hat{k},p)e^{-i2\pi kp}$$
$$= k\int_{-\infty}^{+\infty}dp\,F_d(\vec{k},p)e^{-i2\pi kp} \quad (27)$$

Figure 14A:
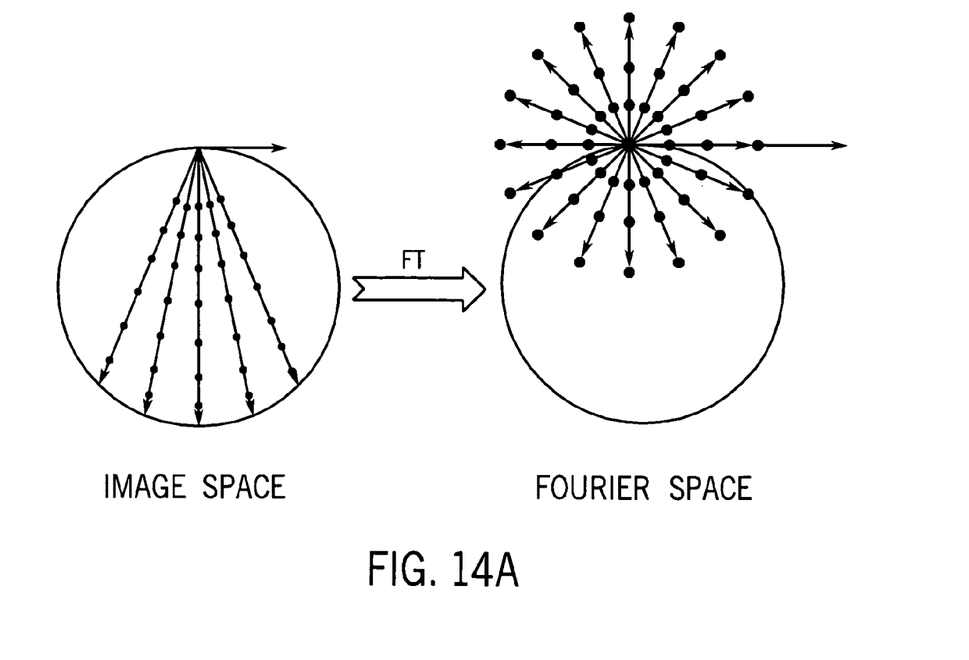
FIGS. 14A–14C are a pictorial representation of the steps used in the present invention to produce a Fourier space image from a weighted divergent beam backprojection.
Figure 14B:
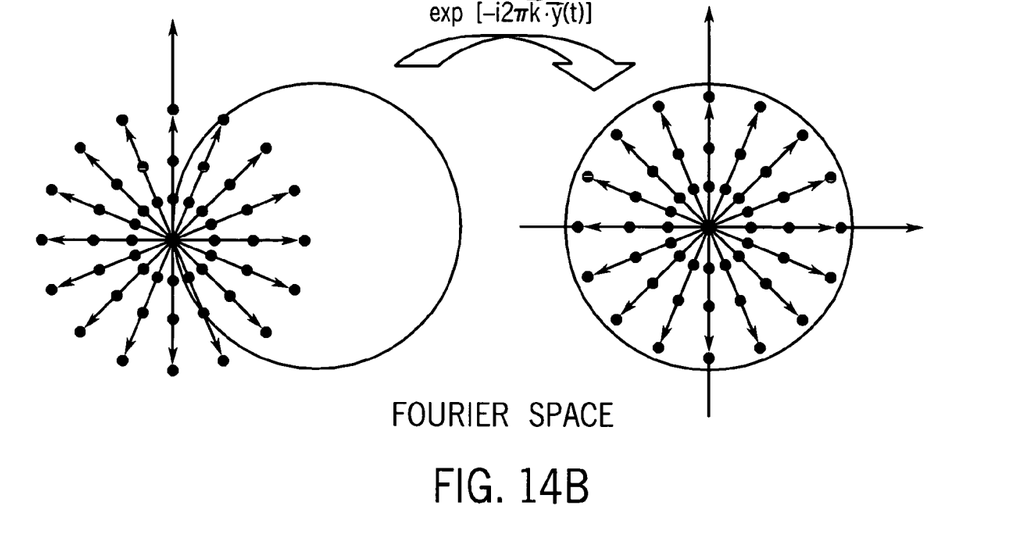
Figure 14C:
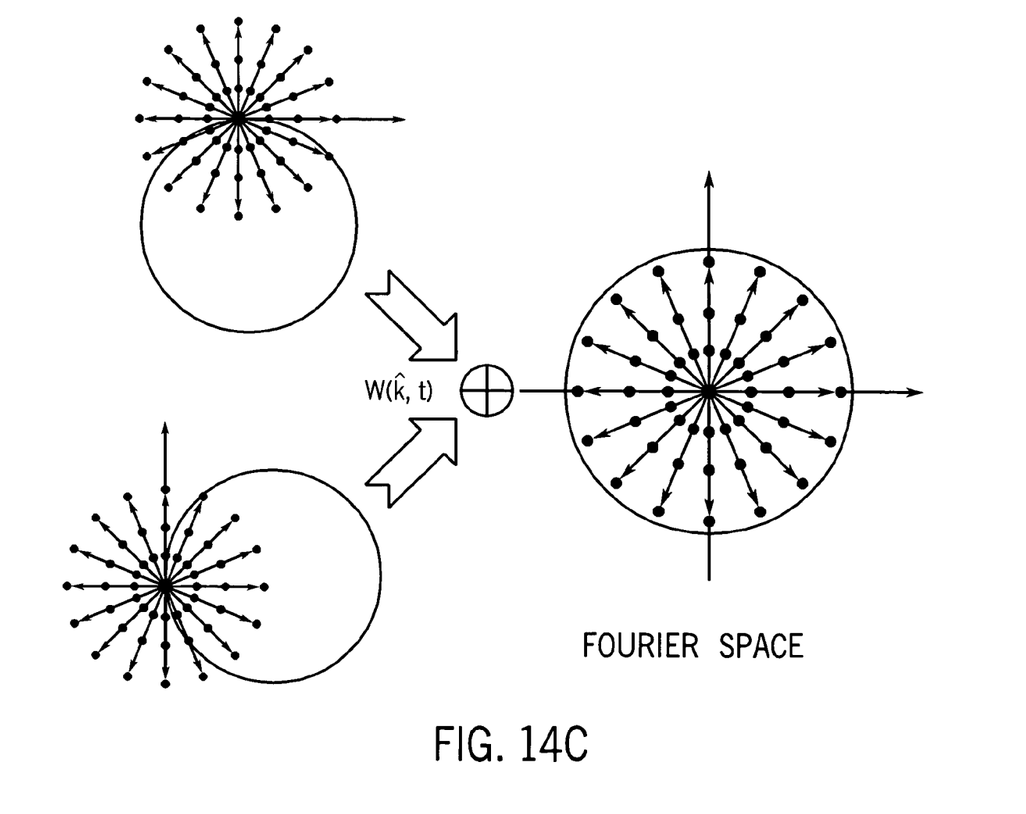

Eqs. (21) and (25) have been used to achieve the second line of the above equation. Moreover, by noting the following fact:

$$kp=\vec{k}\cdot\vec{y}(t) \quad (28)$$

and the fact that factor $\exp[-i2\pi\vec{k}\cdot\vec{y}(t)]$ is a phase shift, an intuitive understanding of Eq. (27) can be given as following: for each individual view of the divergent-beam projections, a local Fourier transform of the $$\frac{1}{r}-\text{weighted}$$

backprojected data is performed as shown in FIG. 14A. However, the objective is to build a global Fourier space of the image object, and thus the information in these local Fourier transforms has to be shifted to the same laboratory coordinate system. This is accomplished by applying a phase factor $\exp[-i2\pi \vec{k} \cdot \vec{y}(t)]$ to give a centered, "global" Fourier space of the image object as shown in FIG. 14B. This is repeated for other acquired projections and local phase shifted Fourier transforms are superposed into the Fourier space of the image object as shown in FIG. 14C.

Our generalized Projection-Slice Theorem (GPST) for the divergent-beam projections is, therefore, as follows. The Fourier transform of the image function is a sum of the phase shifted local Fourier transforms of 1/r weighted backprojection data.

It is easy to see that the Fourier space reconstructed by Eq. (27) is intrinsically non-Cartesian. Thus the sampling density of the Fourier space is not uniform. The sampling density of the central Fourier space is higher than that of the peripheral Fourier space. To compensate the non-uniformity of the Fourier space, a density weighting function $1/k^{D-1}$ should be used in transforming a non-Cartesian data set into a Cartesian data set. However, in the first line of Eq. (27), a prefactor $1/k^{D-2}$, not $1/k^{D-1}$ appears and dominates the divergence of the Fourier space. To mitigate this discrepancy, an integration by parts can be used to rewrite Eq. (27) as $$\tilde{f}(\vec{k}) = \frac{1}{2\pi i k^{D-1}} \int_{-\infty}^{+\infty} dp\, e^{-i2\pi kp} \frac{d}{dp} C_D(\hat{k}, p) \quad (29)$$

In Eq. (29), the prefactor is $1/k^{D-1}$. Therefore, it represents a 1/k Fourier space sampling density compensation in two-dimensional case and $1/k^2$ Fourier space sampling density compensation in three-dimensional case. Geometrically, it is also easy to understand this prefactor. It is essentially the inverse of the radial part of the Jacobian of a polar coordinate and spherical coordinate system in two- and three-dimensional cases respectively.

Eq. (27) and Eq. (29) are central results of the present invention. Starting with the intrinsic nature of the diverging fan-beam and cone-beam projections, by performing a weighted backprojection, and shifting and adding the local Fourier transform of the 1/r—weighted backprojected data array, the Fourier space of the image object is reconstructed. This theorem is valid for both fan beam and cone-beam projections.

DESCRIPTION OF THE PREFERRED EMBODIMENT

Figure 6:
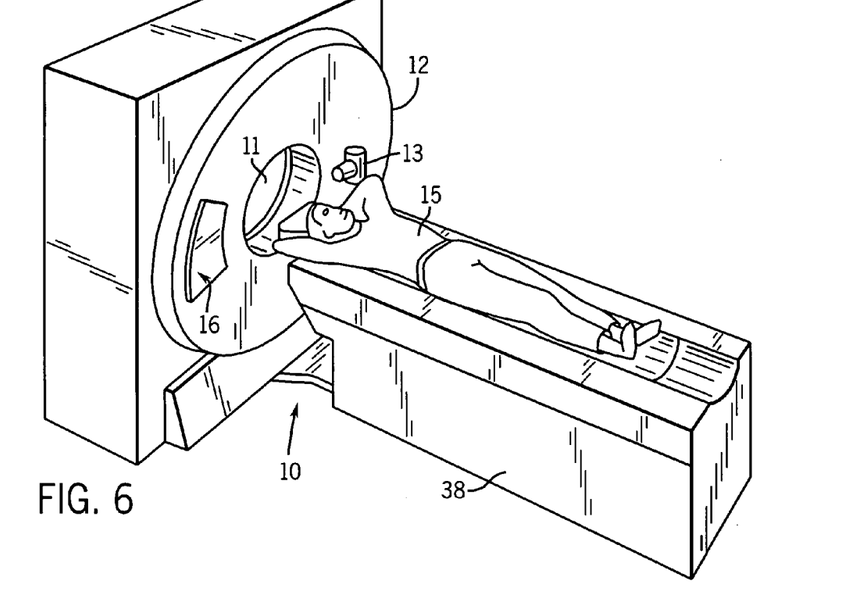
FIG. 6 is a pictorial view of a CT system which employs the present invention.
Figure 7:
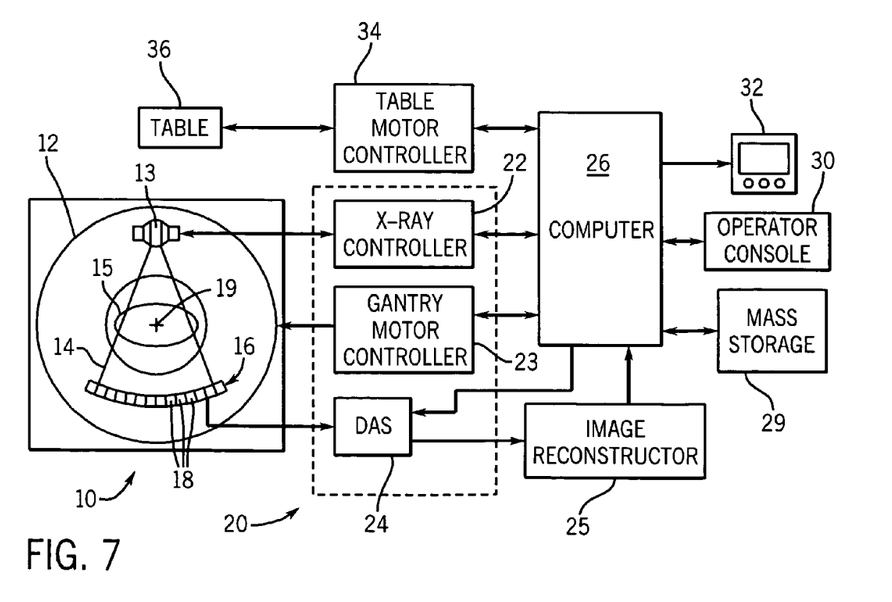
FIG. 7 is a block diagram of the CT system of FIG. 6.

With initial reference to FIGS. 6 and 7, a computed tomography (CT) imaging system 10 includes a gantry 12 representative of a "third generation" CT scanner. Gantry 12 has an x-ray source 13 that projects a cone beam of x-rays 14 toward a detector array 16 on the opposite side of the gantry. The detector array 16 is formed by a number of detector elements 18 which together sense the projected x-rays that pass through a medical patient 15. Each detector element 18 produces an electrical signal that represents the intensity of an impinging x-ray beam and hence the attenuation of the beam as it passes through the patient. During a scan to acquire x-ray projection data, the gantry 12 and the components mounted thereon rotate about a center of rotation 19 located within the patient 15.

The rotation of the gantry and the operation of the x-ray source 13 are governed by a control mechanism 20 of the CT system. The control mechanism 20 includes an x-ray controller 22 that provides power and timing signals to the x-ray source 13 and a gantry motor controller 23 that controls the rotational speed and position of the gantry 12. A data acquisition system (DAS) 24 in the control mechanism 20 samples analog data from detector elements 18 and converts the data to digital signals for subsequent processing. An image reconstructor 25, receives sampled and digitized x-ray data from the DAS 24 and performs high speed image reconstruction according to the method of the present invention. The reconstructed image is applied as an input to a computer 26 which stores the image in a mass storage device 29.

The computer 26 also receives commands and scanning parameters from an operator via console 30 that has a keyboard. An associated cathode ray tube display 32 allows the operator to observe the reconstructed image and other data from the computer 26. The operator supplied commands and parameters are used by the computer 26 to provide control signals and information to the DAS 24, the x-ray controller 22 and the gantry motor controller 23. In addition, computer 26 operates a table motor controller 34 which controls a motorized table 36 to position the patient 15 in the gantry 12.

The CT imaging system is operated to acquire views of attenuation data $g[\vec{y}(t),\hat{r}]$ at a series of gantry angles as the x-ray source 13 is moved to a series of locations on a circular path. In the preferred embodiment an arcuate shaped detector array 16 is employed. As will now be described, each acquired view is processed in near real time and the resulting image data is added to an image data set which can be displayed even as the scan is being performed.

Figure 15:
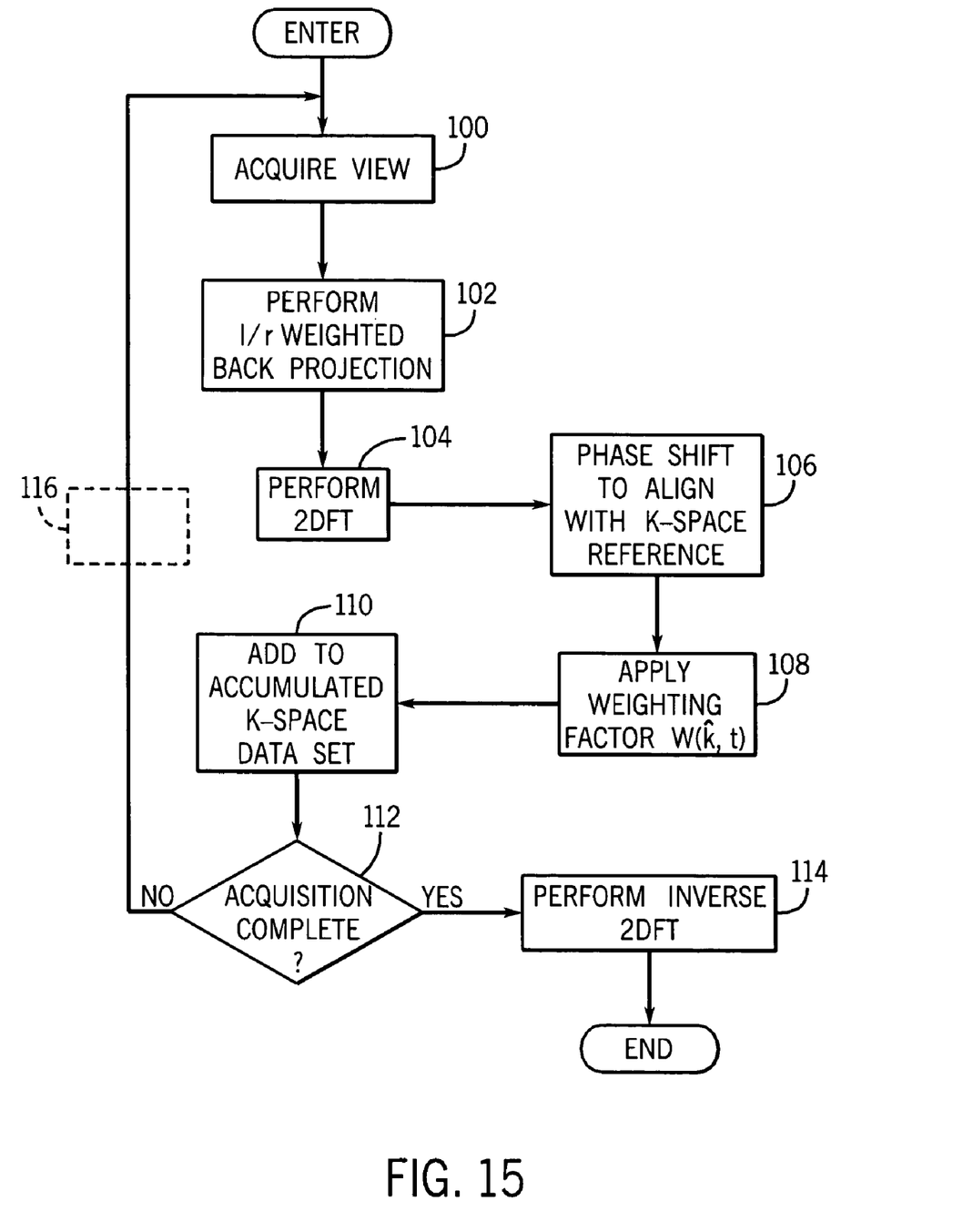
FIG. 15 is a flow chart of a preferred method for practicing the present invention on the CT system of FIG. 6.
Figure 16:
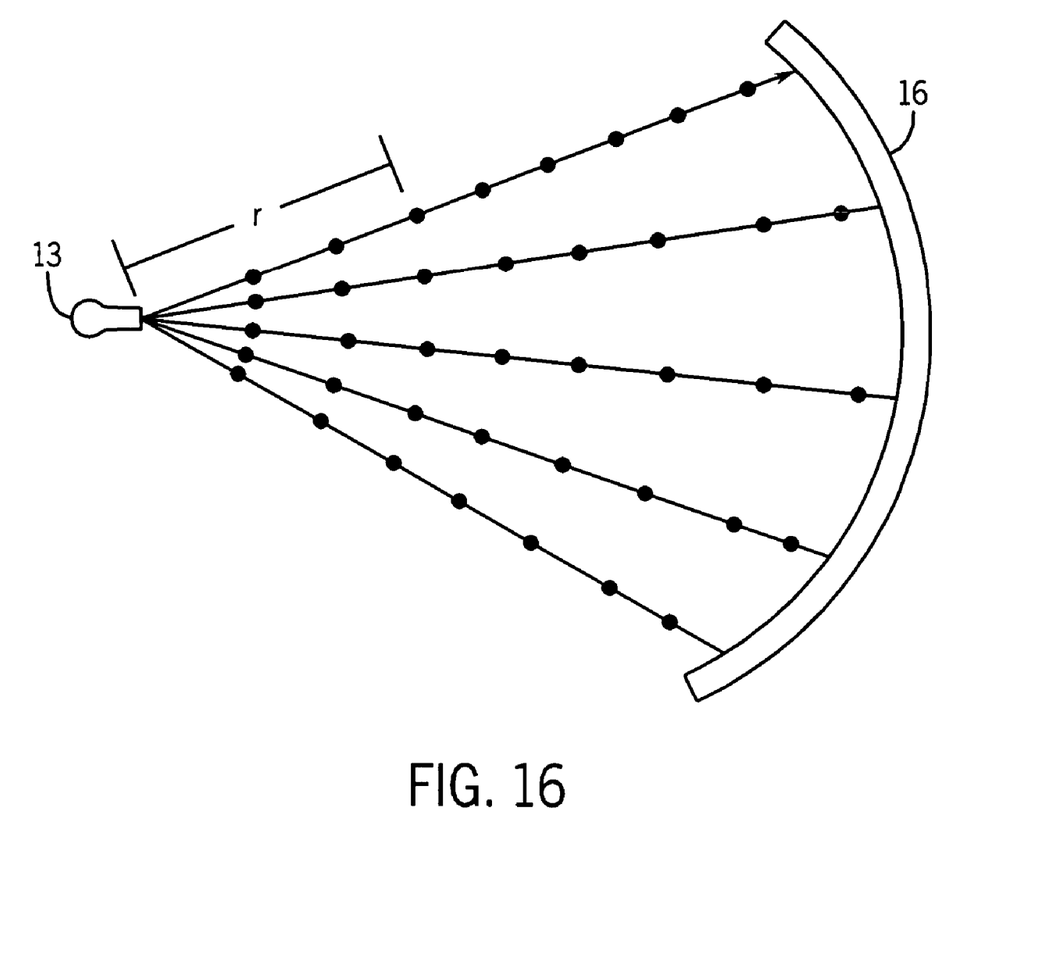
FIG. 16 is a pictorial representation of a backprojection of a divergent beam projection.

Referring particularly to FIG. 15, after each projection view is acquired as indicated at process block 100 the attenuation data acquired by each detector element is backprojected along its divergent ray or beam as indicated at process block 102. As shown in FIG. 16, an array of data points are thus formed in the region between the source 13 of the divergent beam and the arcuate detector 16. These backprojected data points are then weighted by a weighting factor 1/r, where r is the distance of the data point from the beam source point 13.

The backprojected data points are then Fourier transformed as indicated by process block 104. In this embodiment the transformation is a two-dimensional Fourier transformation followed by processing to form a two-dimensional acquired k-space data set, but it can be appreciated that if a cone beam acquisition is performed rather than a fan beam acquisition, a three-dimensional Fourier transformation is performed and a three-dimensional acquired k-space data set is formed by this step. As illustrated in FIG. 14A the Fourier transformation and processing of a backprojected view produces a highly undersampled Fourier space, or k-space, data set whose location and orientation in k-space is determined by the view angle at which it was acquired.

The next steps shift and reorient the acquired k-space data set for a particular view angle to align it with a reference k-space having its origin located at the isocenter of the scanner. The first step as indicated at process block 106 is to perform a phase shift $e^{[i2\pi \vec{k} \cdot \vec{y}(t)]}$ to the acquired k-space data to effectively shift its location in k-space to the isocenter as illustrated in FIG. 14B. Then, as indicated at process block 108, each phase shifted k-space data point is multiplied by a weighting factor w($\vec{k}$, t) to align the direction of the acquired k-space data set with the reference k-space data set as illustrated in FIG. 14C.

The properly correlated k-space data set is then added to an accumulated k-space data set as indicated at process block 110. As each acquired view is processed, it is added to this accumulated k-space data set, and when the data sufficiency condition is satisfied as determined at decision block 112, an image is reconstructed as indicated at process block 114. In this embodiment an inverse two-dimensional Fourier transformation is performed to reconstruct an image of the object acquired by the 2D fan beam.

Because each acquired view can be separately processed to produce an image (albeit not a clinically useful image), a number of variations of this method are possible. For example, process block 114 may be moved to the location indicated by dashed lines 116 in FIG. 15 such that a new image is reconstructed as each view is acquired, processed and accumulated. In this embodiment the image will appear very abstract at the beginning of the scan, become a blurry image of the object, and improve in quality as more views are acquired and processed. If the scan is continued and older views discarded as newer ones at the same view angle are acquired and processed, the image is continuously updated to accurately indicate object motion.

It should also be apparent that it is not necessary to accumulate processed views only in k-space. Such an accumulation can be performed in real space as part of the image reconstruction process 114. In such an embodiment each correlated k-space view is transformed to image space at process block 114 and the resulting image data is added to previously acquired image data.

While a specific x-ray source and detector array geometry is employed in the above-described preferred embodiment, the present invention is not limited to any specific geometry. It is not necessary for the x-ray source to follow a circular path, and indeed, the inventors contemplate that the exact path of the x-ray source may be measured in a calibration procedure and this exact path used in the above processing rather than an assumed perfect circular path. The same is true for a helical scan path. The present invention enables the exact source trajectory to be determined in a calibration step and then used in the subsequent image reconstruction.

The present invention is also applicable to other imaging modalities such as single photon emission computed tomography (SPECT) which employs fan beam collimation with varying focal length.

The conventional PST plays a pivotal role in tomographic image reconstruction from parallel beam projections. It directly maps the Fourier transform of a specific view parallel-beam of projection data into a radial line in the Fourier space of the image object. Sequential measurements at different view angles give a sequential construction of the Fourier space of the image object. The reconstruction of the image object can be performed after the complete Fourier space is constructed or, using the linearity of the Fourier transforms, it can be sequentially performed after each projection is measured. In the present invention, the above concept of reconstructing the Fourier space of image object has been generalized to build the Fourier space of an image object directly from divergent fan-beam and cone-beam projections. The results are expressed in Eq. (27) and (29). An important step in the derivation is to incorporate the diverging nature of the fan-beam and cone-beam projections into the backprojection procedure. It results in a 1/r— weighting factor in the backprojection. In contrast, in the parallel-beam cases the data is backprojected along the projection direction with an equal weight. After the backprojection step, a local Fourier transform is taken for the backprojected data array. Upon aligning and adding all these local Fourier transforms, the Fourier space of the image object is constructed. A difference between parallel beam and divergent beam is manifested in the aligning and adding steps. Due to the equal weighting in the parallel-beam backprojection, the alignment of the local Fourier transform does not induce an extra phase factor. However, in the divergent fan-beam and cone-beam cases, the aligning of a local Fourier transform into a global and common reference frame induces an extra phase factor $\exp[i2\pi \vec{k} \cdot \vec{y}(t)] = \exp(i2\pi p)$. Thus, in the divergent fan-beam and cone-beam cases, adding all the local Fourier transform together is equivalent to performing a Fourier transform with respect to the auxiliary variable $p = \vec{k} \cdot \vec{y}(t)$. The physical meaning of variable p is the projection distance of the X-ray source position along a specific orientation $\vec{k}$ in Fourier space. Although there are some intrinsic differences between parallel-beam and divergent-beam projections, the logical steps in the construction of a Fourier space of an image object are similar in both parallel-beam projection and divergent-beam projections. Thus the results dictated by Eq. (27) and (29) are dubbed as a generalized projection-slice theorem for divergent beam projections, although the concept of a line in the two-dimensional space or a slice in the three-dimensional space loses its original meaning.

The invention claimed is:

1. A computed tomography imaging system, comprising:
an x-ray source producing divergent beams;
a plurality of detector elements for receiving impinging x-ray beams emanating from the x-ray source for a series of projection views in which the source revolves around an object to be imaged;
an acquisition system for acquiring from the detector elements x-ray attenuation data corresponding to each beam at each of the projection views; and
an image reconstructor that receives the x-ray attenuation data from the acquisition system and performs the following steps to reconstruct an image: (a) backprojecting the x-ray attenuation data for each beam to form an array of data points therealong, (b) weighting each backprojected data point by a weighting factor ω(r), where r is the distance between the backprojected data point and a source location of the divergent beams to form weighted backprojected data points, (c) Fourier transforming and processing an array of data which includes the weighted backprojected data points to form an acquired k-space data set; (d) aligning the acquired k-space data set with a reference k-space, and (e) reconstructing an image from the referenced k-space data by performing an inverse Fourier transformation thereon.

2. The system as recited in claim 1 wherein the image reconstructor repeats steps (a) through (e) a plurality of times with the divergent beam moved to a different source position for each repetition.

3. The system as recited in claim 1 wherein the image reconstructor repeats steps (a) through (d) a plurality of times with the divergent beam moved to a different source position for each repetition.

4. The system as recited in claim 1 wherein each divergent beam is a two-dimensional fan beam of x-rays and the Fourier transformations performed in steps (c) and (e) are two-dimensional Fourier transformations.

5. The system as recited in claim 1 wherein each divergent beam is a three-dimensional cone beam of x-rays and the Fourier transformations performed in steps (c) and (e) are three-dimensional Fourier transformations.

6. The system as recited in claim 1 wherein the aligning step (d) includes:
   i) phase shifting the acquired k-space data set; and
   ii) weighting the phase shifted k-space data set.

7. The system as recited in claim 1 wherein the weighting factor $\omega(r)$ is $1/r$.

8. The system as recited in claim 2 wherein the different source positions are located along a source trajectory which extends around the object being imaged.

9. The system as recited in claim 8 wherein the source trajectory is substantially circular.

10. The system as recited in claim 8 wherein the source trajectory is substantially helical.

11. The system as recited in claim 3 wherein the different source positions are located along a source trajectory which extends around an object being imaged.

12. The system as recited in claim 11 wherein the source trajectory is substantially circular.

13. The system as recited in claim 11 wherein the source trajectory is substantially helical.

14. A computed tomography imaging system, comprising:
   an x-ray source producing divergent beams;
   a plurality of detector elements for receiving impinging x-ray beams emanating from the x-ray source for a series of projection views in which the source revolves around an object to be imaged;
   an acquisition system for acquiring from the detector elements x-ray attenuation data corresponding to each beam at each of the projection views; and
   an image reconstructor that receives the x-ray attenuation data from the acquisition system and performs the following steps: (a) backprojecting each acquired projection to form a set of backprojected data; (b) weighting each set of backprojected data; (c) Fourier transforming the weighted backprojected data to form acquired k-space data; (d) aligning the acquired k-space data for each acquired projection with a reference k-space; and (e) reconstructing an image from the aligned k-space data.

15. The system as recited in claim 14 wherein step (e) includes performing an inverse Fourier transformation.

16. The system as recited in claim 14 wherein step (d) includes phase shifting the acquired k-space data by an amount which is a function of the location of a divergent beam source at the time the corresponding projection was acquired.

17. The system as recited in claim 16 wherein step (b) employs a weighting factor which is a function of the distance of the backprojected data from the divergent beam source.

* * * * *